United States Patent
Sishtla

(10) Patent No.: US 12,372,099 B2
(45) Date of Patent: Jul. 29, 2025

(54) SEAL ASSEMBLY FOR COMPRESSOR

(71) Applicant: Carrier Corporation, Palm Beach Gardens, FL (US)

(72) Inventor: Vishnu M. Sishtla, Manlius, NY (US)

(73) Assignee: Carrier Corporation, Palm Beach Gardens, FL (US)

( * ) Notice: Subject to any disclaimer, the term of this patent is extended or adjusted under 35 U.S.C. 154(b) by 737 days.

(21) Appl. No.: 16/845,743

(22) Filed: Apr. 10, 2020

(65) Prior Publication Data

US 2020/0355194 A1    Nov. 12, 2020

Related U.S. Application Data

(60) Provisional application No. 62/843,773, filed on May 6, 2019.

(51) Int. Cl.
*F04D 29/16* (2006.01)
*F04D 17/12* (2006.01)
*F16J 15/44* (2006.01)

(52) U.S. Cl.
CPC ......... *F04D 29/162* (2013.01); *F04D 17/122* (2013.01); *F05B 2240/515* (2013.01); *F05B 2240/57* (2013.01); *F05B 2260/507* (2013.01); *F16J 15/445* (2013.01)

(58) Field of Classification Search
CPC ...... F04D 17/12; F04D 17/122; F04D 27/002; F04D 27/0246; F04D 29/08; F04D 29/083; F04D 29/162; F01D 11/22; F16J 15/445; F16J 15/447; F16J 15/4472; F05D 2240/224; F05D 2240/55; F05D 2240/57; F05D 2240/577; F05D 2240/63; F05D 2260/6022
See application file for complete search history.

(56) References Cited

U.S. PATENT DOCUMENTS

| | | | |
|---|---|---|---|
| 4,523,896 A * | 6/1985 | Lhenry | F04D 29/058 310/90.5 |
| 5,547,350 A | 8/1996 | Rawal et al. | |
| 6,935,838 B1 | 8/2005 | Wang | |
| 7,775,763 B1 * | 8/2010 | Johnson | F04D 29/162 415/111 |

(Continued)

FOREIGN PATENT DOCUMENTS

| | | |
|---|---|---|
| DE | 3513116 | 10/1986 |
| JP | S6098196 | 6/1985 |
| JP | H11257293 | 9/1999 |

OTHER PUBLICATIONS

Extended EP Search Report for EP Application No. EP20171512.5 dated Oct. 16, 2020.

(Continued)

*Primary Examiner* — Brian P Wolcott
(74) *Attorney, Agent, or Firm* — Carlson, Gaskey & Olds, P.C.

(57) ABSTRACT

A seal assembly for a compressor includes at least one impeller. At least one seal land is associated with the impeller including a plurality of radially stepped surfaces. A seal is associated with each of at least one seal lands. The seal includes a plurality of radially stepped projections corresponding to the plurality of radially stepped surfaces on at least one seal land. At least one actuator is configured to move at least one seal land relative to the seal.

18 Claims, 4 Drawing Sheets

(56) References Cited

U.S. PATENT DOCUMENTS

| | | | |
|---|---|---|---|
| 9,261,104 B2 | 2/2016 | Stock | |
| 9,567,864 B2 | 2/2017 | Iurisci et al. | |
| 9,829,008 B2 | 11/2017 | Bigi et al. | |
| 10,161,406 B2 | 12/2018 | Sishtla | |
| 10,208,762 B2 | 2/2019 | Venkataraman et al. | |
| 10,218,245 B2 | 2/2019 | Oxman et al. | |
| 10,280,932 B2* | 5/2019 | Mei | F04D 29/584 |
| 10,774,839 B2* | 9/2020 | Alban | F04D 29/0516 |
| 10,858,951 B2* | 12/2020 | Hasegawa | F04D 29/041 |
| 2007/0065276 A1 | 3/2007 | Muller et al. | |
| 2007/0065277 A1 | 3/2007 | Muller et al. | |
| 2009/0008881 A1* | 1/2009 | Lee | F16J 15/445 |
| | | | 277/412 |
| 2010/0034646 A1 | 2/2010 | Magara et al. | |
| 2013/0164119 A1 | 6/2013 | Nakaniwa | |
| 2014/0169954 A1 | 6/2014 | Iurisci | |
| 2015/0104335 A1 | 4/2015 | Faller | |
| 2016/0195100 A1 | 7/2016 | Alban et al. | |
| 2016/0238015 A1 | 8/2016 | Mei et al. | |
| 2017/0342995 A1 | 11/2017 | Ottow et al. | |
| 2018/0202306 A1 | 7/2018 | Hudson et al. | |

OTHER PUBLICATIONS

Thermoplastic Labyrinth Seals Centrifugal Compressors—15 Years of Experience. John K. Whalen, PE.

* cited by examiner

SEAL ASSEMBLY FOR COMPRESSOR

CROSS-REFERENCE TO RELATED APPLICATION

This application claims priority to U.S. Provisional Application No. 62/843,773, which was filed on May 6, 2019 and is incorporated herein by reference.

BACKGROUND

The disclosure relates to compressors. More particularly, the disclosure relates to electric motor-driven magnetic bearing compressors.

One particular use of electric motor-driven compressors is liquid chillers. An exemplary liquid chiller uses a hermetic centrifugal compressor. The exemplary unit comprises a standalone combination of the compressor, the cooler unit, the chiller unit, the expansion device, and various additional components.

Some compressors include a transmission intervening between the motor rotor and the impeller to drive the impeller at a faster speed than the motor. In other compressors, the impeller is directly driven by the rotor (e.g., they are on the same shaft).

Various bearing systems have been used to support compressor shafts. One particular class of compressors uses magnetic bearings (more specifically, electro-magnetic bearings). To provide radial support of a shaft, a pair of radial magnetic bearings may be used. Each of these may be backed up by a mechanical bearing (a so-called "touchdown" bearing). Additionally, one or more other magnetic bearings may be configured to resist loads that draw the shaft upstream (and, also, opposite loads). Upstream movement tightens the clearance between the impeller and its shroud and, thereby, risks damage. Opposite movement may open clearance and reduce efficiency.

Magnetic bearings use position sensors for adjusting the associated magnetic fields to maintain radial and axial positioning against the associated radial and axial static loads of a given operating condition and further control synchronous vibrations.

SUMMARY

In one exemplary embodiment, a seal assembly for a compressor includes at least one impeller. At least one seal land is associated with the impeller including a plurality of radially stepped surfaces. A seal is associated with each of at least one seal lands. The seal includes a plurality of radially stepped projections corresponding to the plurality of radially stepped surfaces on at least one seal land. At least one actuator is configured to move at least one seal land relative to the seal.

In a further embodiment of the above, at least one actuator is configured to move the seal between a first axial position and a second different axial position.

In a further embodiment of any of the above, at least one seal land is attached to one of the impeller and a housing assembly. The seal is attached to the other of the impeller and the housing assembly.

In a further embodiment of any of the above, the plurality of radially stepped projections include distal ends with an increasing radially dimension in a first axial direction. Adjacent ones of the plurality of radially stepped projections are separated by a trough.

In a further embodiment of any of the above, the plurality of radially stepped surfaces include an increasing radial dimension in the first axial direction.

In a further embodiment of any of the above, the first axial direction is an axially aft direction.

In a further embodiment of any of the above, the seal is fixed relative to a housing assembly of the compressor. At least one seal land is fixed relative to the impeller.

In a further embodiment of any of the above, the plurality of radially stepped surfaces include three radially stepped surfaces. The plurality of radially stepped projections include three radially stepped projections.

In another exemplary embodiment, a compressor assembly includes at least one impeller. A shaft is in driving engagement with at least one impeller. At least one electromagnetic bearing supports the shaft. At least one seal assembly is associated with at least one impeller. At least one seal land is associated with at least one impeller including a plurality of radially stepped surfaces. A seal is associated with each of at least one seal land. The seal includes a plurality of radially stepped projections that correspond to the plurality of radially stepped surface on at least one seal land. At least one actuator is configured to create movement between at least one seal land and the seal.

In a further embodiment of any of the above, at least one electromagnetic bearing includes at least one radial support electromagnetic bearing system and at least one axial thrust electromagnetic bearing system.

In a further embodiment of any of the above, at least one actuator is configured to move the seal between a first axial position and a second different axial position.

In a further embodiment of any of the above, at least one seal land is attached to one of the at least one impeller. A housing assembly and the seal are attached to the other of the at least one impeller and the housing assembly.

In a further embodiment of any of the above, the plurality of radially stepped projections include distal ends with an increasing radially dimension in a first axial direction.

In a further embodiment of any of the above, the plurality of radially stepped surfaces include an increasing radial dimension in the first axial direction. Adjacent ones of the plurality of radially stepped projections are separated by a trough.

In a further embodiment of any of the above, at least one impeller includes a first stage impeller and a second stage impeller. At least one seal assembly includes a first seal assembly associated with the first stage impeller and a second and third seal assembly associated with the second stage impeller.

In a further embodiment of any of the above, the first seal assembly is located on an axially upstream side of the first stage impeller. The second seal assembly is located on an axially upstream side of the second stage impeller. The third seal assembly is located on an axially downstream side of the second stage impeller.

In another exemplary embodiment, a method of operating a compressor includes supporting a shaft in the compressor with at least one electromagnetic bearing. A seal clearance is determined based on an operating condition of the compressor. The seal clearance is increased based on the operating condition by creating axial movement between a seal land attached to one of an impeller and a housing assembly and a seal attached to the other of the impeller and the housing assembly.

In a further embodiment of any of the above, the seal land includes a plurality of radially stepped surfaces. The seal includes a plurality of radially stepped projections.

In a further embodiment of any of the above, the operating condition includes at least one of a start-up or a shut-down condition for the compressor to increase seal clearance.

In a further embodiment of any of the above, at least one electromagnetic bearing includes at least one radial support electromagnetic bearing system and at least one axial thrust electromagnetic bearing system.

DETAILED DESCRIPTION

Figure 1:
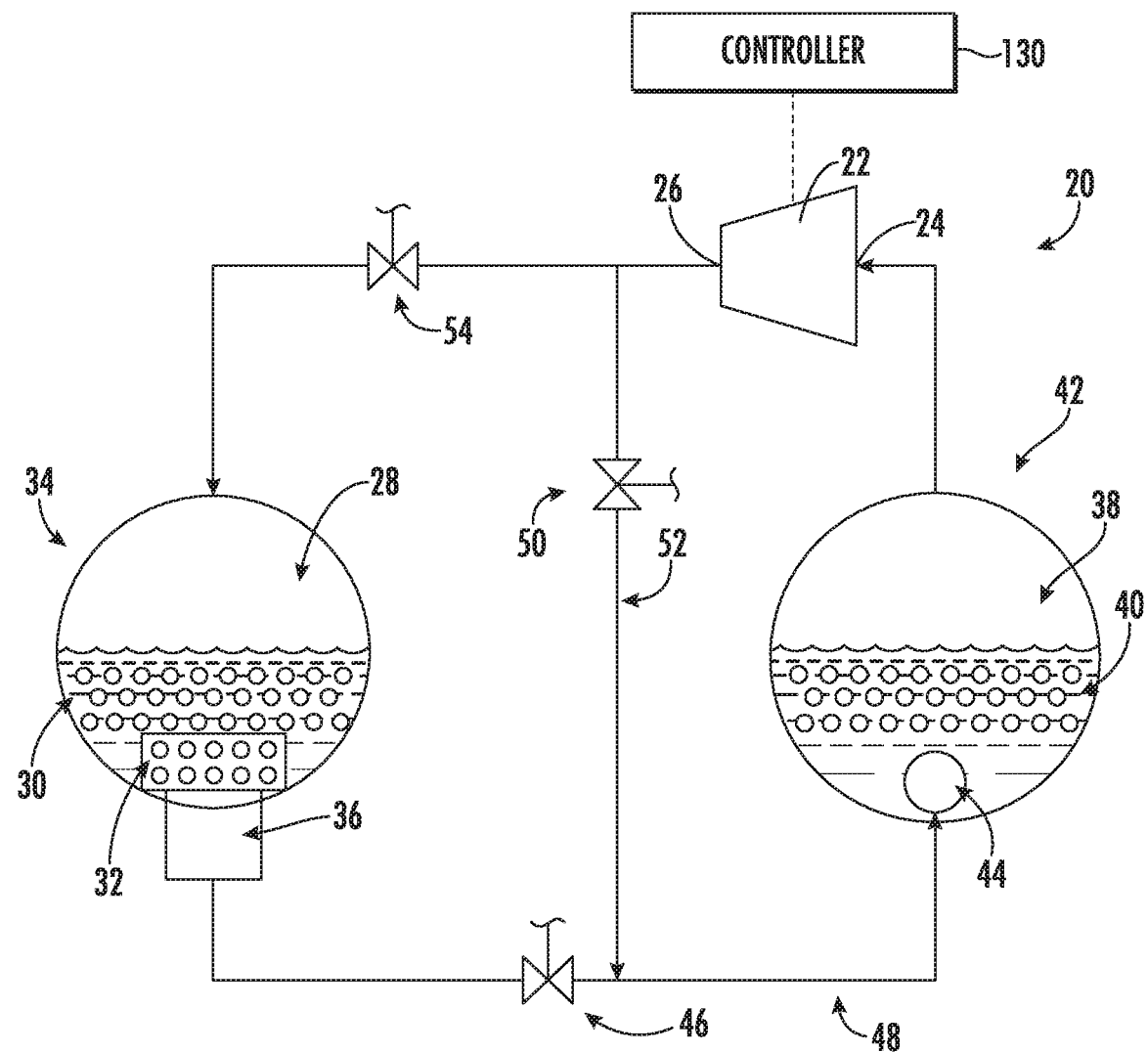
FIG. 1 is a schematic view of an example chiller system.

FIG. 1 shows a vapor compression system 20. The exemplary vapor compression system 20 is a chiller system. The system 20 includes a centrifugal compressor 22 having a suction port (inlet) 24 and a discharge port (outlet) 26. The system further includes a first heat exchanger 28 in a normal operating mode being a heat rejection heat exchanger (e.g., a gas cooler or condenser). In an exemplary system, the first heat exchanger 28 is a refrigerant-water heat exchanger formed by tube bundles 30, 32 in a condenser unit 34 where the refrigerant is cooled by an external water flow. A float valve 36 controls flow through the condenser outlet from a subcooler chamber surrounding the subcooler bundle 32.

The system further includes a second heat exchanger 38 (in the normal mode a heat absorption heat exchanger or evaporator). In the exemplary system, the second heat exchanger 38 is a refrigerant-water heat exchanger formed by a tube bundle 40 for chilling a chilled water flow within a chiller unit 42. The chiller unit 42 includes a refrigerant distributor 44. An expansion device 46 is downstream of the compressor and upstream of the evaporator 38 along the normal mode refrigerant flowpath 48 (the flowpath being partially surrounded by associated piping, etc.).

A hot gas bypass valve 50 is positioned along a bypass flowpath branch 52 extending between a first location downstream of the outlet 26 and upstream of an isolation valve 54 and a second location upstream of the inlet of the cooler and downstream of the expansion device 46.

Figure 2:
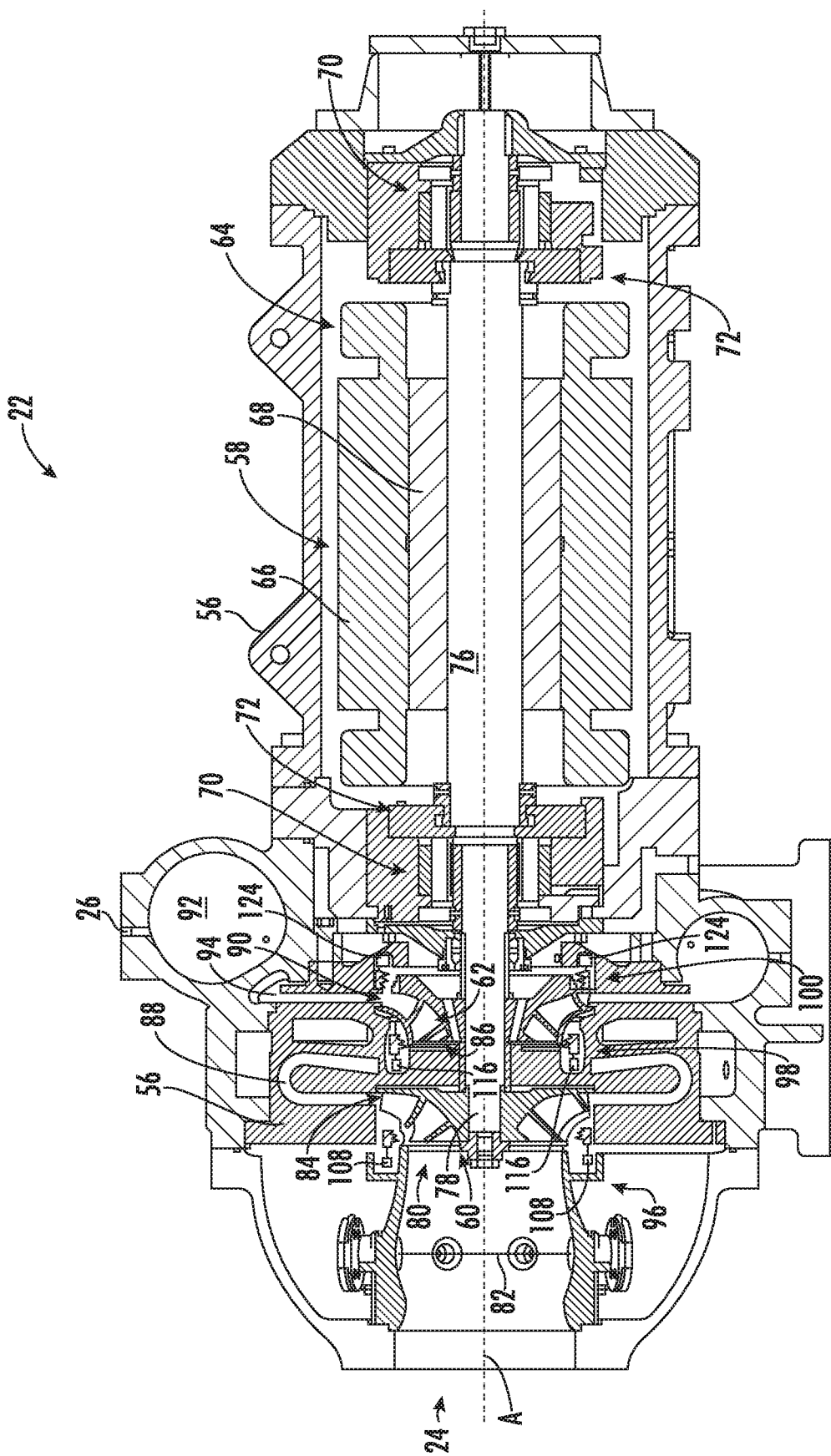
FIG. 2 is a partially schematic view of an example compressor from the chiller system of FIG. 1.

As shown in FIG. 2, the compressor 22 is contained within an exemplary housing assembly 56. The housing assembly 56 contains an electric motor 58 for driving a first stage impeller 60 and a second stage impeller 62. The electric motor 58 drives the first and second stage impellers 60, 62 in the first mode to compress fluid (refrigerant) to draw fluid (refrigerant) in through the inlet 24, compress the fluid, and discharge the fluid from the outlet 26. In the illustrated example, the first and second stage impellers 60, 62 are directly driven by the electric motor 58.

The housing assembly 56 defines a motor compartment 64 containing a stator 66 and a rotor 68 of the electric motor 58. In the illustrated example, the rotor 68 is located partially within the stator 66 and is mounted for rotation about a rotor axis A for driving the first and second stage impellers 60, 62. The rotor 68 is supported radially relative to the housing assembly 56 with a radial support electromagnetic bearing system 70 located on each opposing axial side of the electric motor 58. Additionally, the rotor 68 is supported axially relative to the housing assembly 56 with an axial thrust electromagnetic bearing system 72 located on each opposing axial side of the electric motor 58. The first and second stage impellers 60 and 62 are mounted to a shaft 76 (e.g., to an end portion 78) to rotate with the rotor 68 as a unit about the rotor axis A. In this disclosure, axial or axially and radial or radially is in relation to the rotor axis A unless stated otherwise.

As shown in FIG. 2, fluid enters the compressor 22 through the inlet 24. Between the inlet 24 and an inlet 80 of the first stage impeller 60, the compressor 22 includes a controllable inlet guide vane (IGV) array 82 for controlling an amount of fluid entering the compressor 22. An outlet 84 of the first stage impeller 60 is fluidly connected with an inlet 86 of the second stage impeller 62 through a fluid passageway 88. The fluid passageway 88 extends radially outward from the outlet 84 of the first stage impeller 60 and turns back radially inward to join the inlet 86 of the second stage impeller 62. An outlet 90 of the second stage impeller 62 is fluidly connected to an outlet plenum 92 through a fluid passageway 94.

During operation of the compressor 22, it is necessary to create a seal between portions of the first and second stage impellers 60, 62 and the housing assembly 56. In particular, the first stage impeller 60 is sealed with a first seal assembly 96 and the second impeller stage 62 is sealed with a second seal assembly 98 and a third seal assembly 100.

Figure 3A:
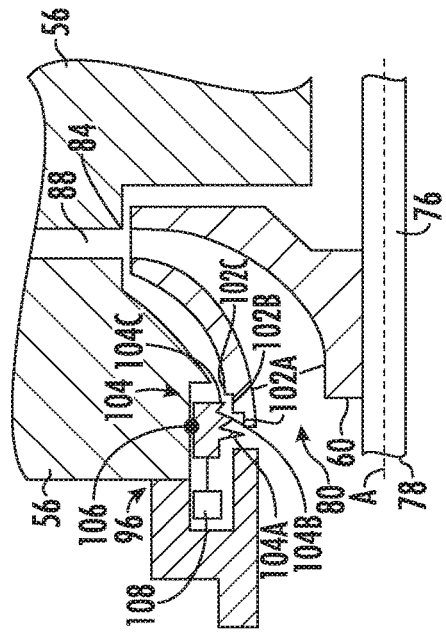
FIG. 3A is an enlarged view of an example first stage impeller with a first seal assembly in a first position.
Figure 3B:
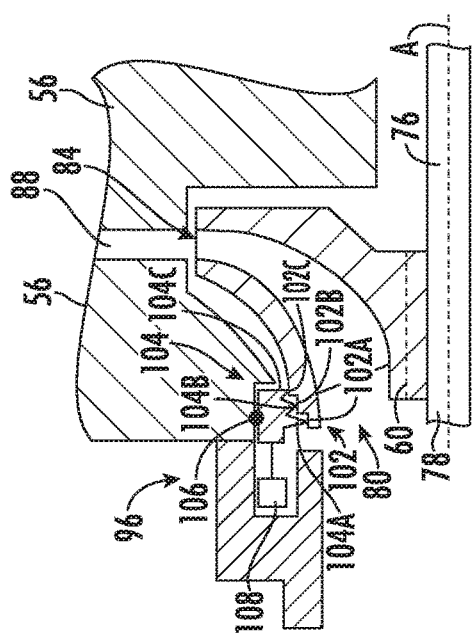
FIG. 3B is an enlarged view of the example first stage impeller with the first seal assembly in a second position.

As shown in FIGS. 3A-3B, the first seal assembly 96 includes a stepped seal land 102 forming a circumferential ring on a radially outer side of the inlet 80 to the first stage impeller 60. In the illustrated example, the seal land 102 includes steps 102A, 102B, 102C each having an increasing radially dimension in a downstream direction relative to fluid flow through the compressor 22.

The first seal assembly 96 also includes a seal 104 forming a complete ring that includes a corresponding number of seal projections 104A, 104B, 104C to the number of steps 102A, 102B, 102C in the seal land 102. The seal projections 104A, 104B, 104C include distal ends with an increasing radial dimension in an axially downstream direction and are separated by troughs. A radially outer side of the seal 104 is sealed relative to a portion of the housing assembly 56 through an O-ring 106.

During operation of the compressor 22, the first seal assembly 96 is located in the first position as shown in FIG. 3A with the first seal 104 located in an axially downstream position with the projections 104A, 104B, 104C axially aligned with a corresponding one of the steps 102A, 102B, 102C in the seal land 102. The configuration of FIG. 3A creates a labyrinth seal with the projections 104A, 104B, 104C maintaining a close tolerance with the steps 102A, 102B, 102C.

When the compressor 22 is starting up or shutting down, at least one actuator 108 moves the seal 104 to an axially forward position such that the projections 104A, 104B, 104C are no longer axially aligned with a corresponding one of the steps 102A, 102B, 102C. This creates a larger clearance between the seal 104 and the seal land 102 to prevent the seal 104 from contacting the seal land 102 when the electromagnetic bearings 70, 72 are in a start-up or shut-down phase resulting in greater radial movement of the shaft 76. This configuration reduces leakage of fluid between a forward end of the first stage impeller 60 and the housing assembly 56 to provide an increase in efficiency of the compressor 22 during normal operating conditions.

Figure 4A:
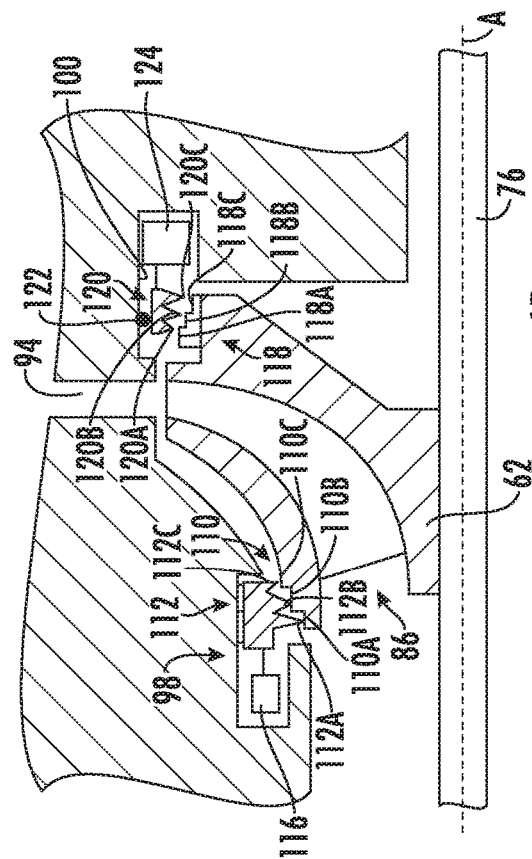
FIG. 4A is an enlarged view of an example second stage impeller with a second and third seal assembly in a first position.
Figure 4B:
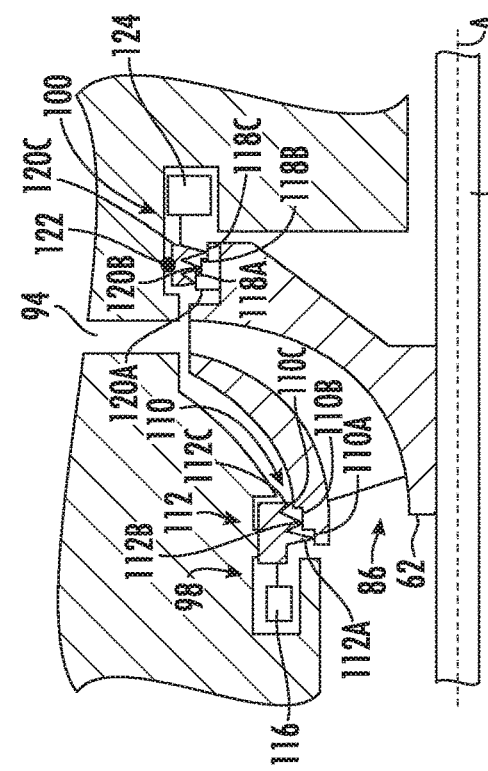
FIG. 4B is an enlarged view of the example second stage impeller with the second and third seal assembly in a second position.

As shown in FIGS. 4A-4B, the second and third seal assemblies 98, 100 are associated with an upstream and downstream side of the second stage impeller 62, respectively. The second seal assembly 98 includes a stepped seal land 110 forming a circumferential ring on a radially outer side of the inlet 86 to the second stage impeller 62. In the illustrated example, the seal land 110 includes steps 110A, 110B, 110C each having an increasing radially dimension in a downstream direction relative to fluid flow through the compressor 22.

The second seal assembly 98 also includes a seal 112 that includes a corresponding number of seal projections 112A, 112B, 112C to the number of steps 110A, 110B, 110C in the seal land 110. The seal projections 112A, 112B, 112C include distal ends with an increasing radial dimension in an axially downstream direction and are separated by troughs. A radially outer side of the seal 112 is sealed relative to a portion of the housing assembly 56 through an O-ring 114.

During operation of the compressor 22, the second seal assembly 98 is located in a first position as shown in FIG. 4A with the first seal 112 forming a complete ring located in an axially downstream position with the projections 112A, 112B, 112C axially aligned with a corresponding one of the steps 110A, 110B, 110C in the second seal land 110. The configuration of FIG. 4A creates a labyrinth seal with the projections 112A, 112B, 112C maintaining a close tolerance with the steps 110A, 110B, 110C.

When the compressor 22 is starting up or shutting down, at least one actuator 116 moves the seal 112 to an axially forward position such that the projections 112A, 112B, 112C are no longer axially aligned with a corresponding one of the steps 110A, 110B, 110C. This creates a larger clearance between the seal 112 and the seal land 110 to prevent the seal 112 from contacting the seal land 110 when the electromagnetic bearings 70, 72 are in a start-up or shut-down phase resulting in greater radial movement of the shaft 76. This configuration reduces leakage of fluid between a forward end of the second stage impeller 62 and the housing assembly 56 to provide an increase in efficiency of the compressor 22 during normal operating conditions.

The third seal assembly 100 includes a stepped seal land 118 forming a circumferential ring on an axially aft side of the outlet 90 to the second stage impeller 62. In the illustrated example, the seal land 118 includes steps 118A, 118B, 118C each having an increasing radially dimension in a downstream direction relative to fluid flow through the compressor 22.

The third seal assembly 100 also includes a seal 120 that includes a corresponding number of seal projections 120A, 120B, 120C to the number of steps 118A, 118B, 118C in the seal land 118. The seal projections 118A, 118B, 118C include distal ends with an increasing radial dimension in an axially downstream direction and are separated by troughs. A radially outer side of the seal 118 is sealed relative to a portion of the housing assembly 56 through an O-ring 122.

During operation of the compressor 22, the third seal assembly 100 is located in a first position as shown in FIG. 4A with the third seal 120 forming a complete ring located in an axially downstream position with the projections 120A, 120B, 120C axially aligned with a corresponding one of the steps 118A, 118B, 118C in the second seal land 110. The configuration of FIG. 4A creates a labyrinth seal with the projections 120A, 120B, 120C maintaining a close tolerance with the steps 118A, 118B, 118C.

When the compressor 22 is starting up or shutting down, at least one actuator 124 moves the seal 120 to an axially forward position such that the projections 120A, 120B, 120C are no longer axially aligned with a corresponding one of the steps 118A, 118B, 118C. This creates a larger clearance between the seal 120 and the seal land 118 to prevent the seal 120 from contacting the seal land 118 when the electromagnetic bearings 70, 72 are in a start-up or shut-down phase resulting in greater radial movement of the shaft 76. This configuration reduces leakage of fluid between an aft portion of the second stage impeller 62 and the housing assembly 56 to provide an increase in efficiency of the compressor 22 during normal operating conditions.

Figure 5:
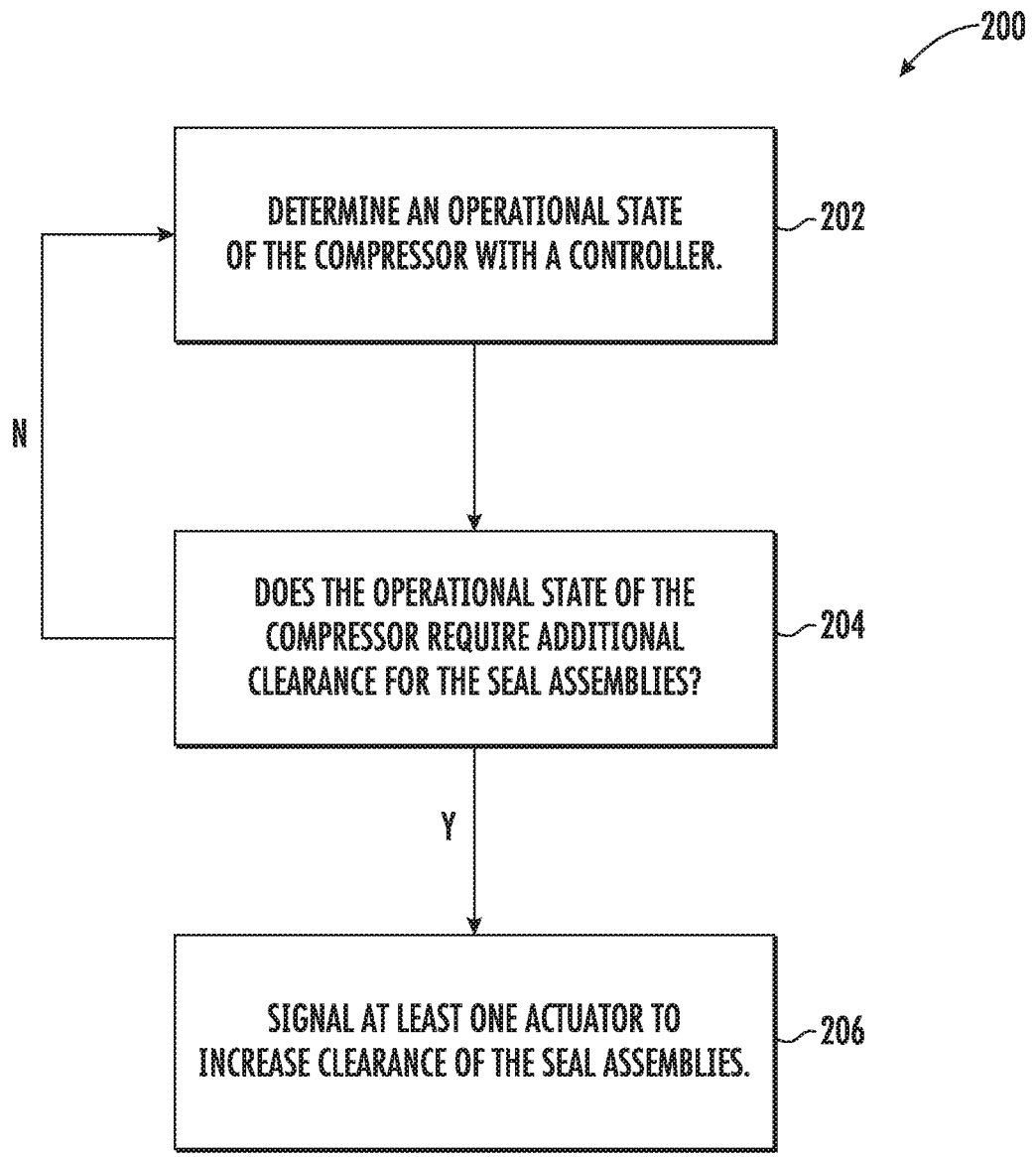
FIG. 5 illustrates a flow diagram for an example method of operating the compressor of FIG. 1.

During operation of the compressor 22, a controller 130 (FIG. 1) determines an operational state of the compressor 22 as shown in the method of operating the compressor 200 in FIG. 5. (Step 202). The controller 130 will then determine if the operational state of the compressor 22 requires increased clearance in the first, second, and third seal assemblies 96, 98, 100. (Step 204). Operational states that may require additional clearance may include at least one of start-up and shut-down conditions. If the controller 103 determines that the compressor 22 is not in an operation state that requires additional clearance, the controller 130 will continue to monitor for changes in the operational state of the compressor 22.

If the controller 130 determines that the compressor 22 is in an operational state that requires additional clearance, the controller 130 sends a signal to increase clearance between the first, second, and third seals 104, 112, 120 and a respective one of the first, second and third seal lands 102, 110, 118. (Step 206). In one example, the signal from the controller 130 is sent to the actuators 108, 116, and/or 124 to move the first, second, and/or third seals 104, 112, 120 to create additional clearance with the first, second, and third seal lands 102, 110, 118. In another example, the signal from the controller 130 is sent to the actuator 126 to move the shaft 76 axially as discussed above without moving the first, second, and third seals 104, 112, 120 relative to the housing assembly 56.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A seal assembly for a compressor comprising:
   an impeller; and
   at least one seal assembly associated with the impeller, the at least one seal assembly including:
      a seal land fixed relative to the impeller and having a plurality of radially stepped surfaces;
      a seal associated with the seal land, wherein the seal includes a plurality of radially stepped projections corresponding to the plurality of radially stepped surfaces on the seal land; and
      an actuator configured to create movement between the seal land and the seal, wherein the actuator is configured to move the seal between a first axial position and a second different axial position in response to a signal from a controller.

2. The assembly of claim 1, wherein the plurality of radially stepped projections include distal ends with an increasing radially dimension in a first axial direction and adjacent ones of the plurality of radially stepped projections are separated by a trough and the plurality of radially stepped surfaces axially spaced from each other relative to a rotational axis of the impeller.

3. The assembly of claim 2, wherein the plurality of radially stepped surfaces include an increasing radial dimension in the first axial direction.

4. The assembly of claim 3, wherein the first axial direction is an axially aft direction.

5. The assembly of claim 1, wherein the plurality of radially stepped surfaces include three radially stepped surfaces and the plurality of radially stepped projections include three radially stepped projections and the actuator includes an actuator arm in engagement with the seal and moveable between an extended position and a retracted position.

6. A compressor assembly comprising:
at least one impeller;
a shaft in driving engagement with the at least one impeller;
at least one electromagnetic bearing supporting the shaft; and
at least one seal assembly associated with the at least one impeller, the at least one seal assembly includes:
a seal land attached to and configured to rotate with the at least one impeller and the seal land includes a plurality of radially stepped surfaces;
a seal associated with the seal land, wherein the seal includes a plurality of radially stepped projections corresponding to the plurality of radially stepped surface on the seal land; and
an actuator configured to create movement between the seal land and the seal, wherein the actuator is configured to move the seal between a first axial position and a second different axial position in response to a signal from a controller.

7. The assembly of claim 6, wherein the at least one electromagnetic bearing includes at least one radial support electromagnetic bearing system and at least one axial thrust electromagnetic bearing system and the at least one electromagnetic bearing is located axially between the at least one impeller and an electric motor driving the shaft.

8. The assembly of claim 6, wherein the plurality of radially stepped projections include distal ends with an increasing radially dimension in a first axial direction and the actuator includes an actuator arm in engagement with the seal and moveable between an extended position and a retracted position.

9. The assembly of claim 8, wherein the plurality of radially stepped surfaces include an increasing radial dimension in the first axial direction and adjacent ones of the plurality of radially stepped projections are separated by a trough.

10. The assembly of claim 6, wherein the at least one impeller includes a first stage impeller and a second stage impeller and the at least one seal assembly includes a first seal assembly associated with the first stage impeller and a second and third seal assembly associated with the second stage impeller.

11. The assembly of claim 10, wherein the first seal assembly is located on an axially upstream side of the first stage impeller, the second seal assembly is located on an axially upstream side of the second stage impeller, and the third seal assembly is located on an axially downstream side of the second stage impeller.

12. A method of operating a compressor comprising:
supporting a shaft in the compressor with at least one electromagnetic bearing;
determining a desired seal clearance of a seal assembly between a seal and a seal land based on an operating condition of the compressor; and
increasing the seal clearance based on the operating condition by creating axial movement between the seal land attached to an impeller and a seal moveable relative to a housing assembly, wherein an actuator creates the axial movement of the seal to move the seal between a first axial position and a second different axial position in response to a signal from a controller.

13. The method of claim 12, wherein the operating condition includes at least one of a start-up or a shut-down condition for the compressor to increase seal clearance and the actuator includes an actuator arm in engagement with the seal and moveable between an extended position and a retracted position.

14. The method of claim 13, wherein the at least one electromagnetic bearing includes at least one radial support electromagnetic bearing system and at least one axial thrust electromagnetic bearing system and the at least one electromagnetic bearing is located axially between the impeller and an electric motor driving the shaft.

15. The assembly of claim 11, wherein the at least one seal assembly includes an O-ring in engagement with a radially outer side of the seal and a radially inner surface on a housing assembly of the compressor.

16. The assembly of claim 1, wherein the at least one seal assembly includes a first seal assembly located adjacent an axially upstream edge of the impeller and a second seal assembly located adjacent an axially downstream edge of the impeller.

17. The assembly of claim 1, including an O-ring in engagement with a radially outer side of the seal and a radially inner surface of a housing assembly of the compressor.

18. The method of claim 12, wherein the seal assembly includes:
the seal land fixed relative to the impeller and having a plurality of radially stepped surfaces;
the seal associated with the seal land and including a plurality of radially stepped projections corresponding to the plurality of radially stepped surfaces on the seal land;
an O-ring engaging the seal and a housing assembly of the compressor; and
an actuator configured to move the seal relative to the seal land.

* * * * *